(12) United States Patent
Satou et al.

(10) Patent No.: US 6,777,107 B2
(45) Date of Patent: Aug. 17, 2004

(54) STRUCTURAL BODY FORMED BY FRICTION STIR WELDING

(75) Inventors: Akihiro Satou, Hitachi (JP); Masakuni Ezumi, Kudamatsu (JP); Kazusige Fukuyori, Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 26 days.

(21) Appl. No.: 10/231,070

(22) Filed: Aug. 30, 2002

(65) Prior Publication Data

US 2003/0000996 A1 Jan. 2, 2003

Related U.S. Application Data

(62) Division of application No. 09/927,549, filed on Aug. 13, 2001, now Pat. No. 6,471,112, which is a division of application No. 09/404,651, filed on Sep. 24, 1999, now Pat. No. 6,315,187.

(30) Foreign Application Priority Data

Sep. 29, 1998 (JP) .......................................... 10-274618

(51) Int. Cl.[7] ............................................. B23K 20/12
(52) U.S. Cl. .................................. 428/615; 228/112.1
(58) Field of Search ................................ 428/544, 615; 228/112.1, 2.1

(56) References Cited

U.S. PATENT DOCUMENTS

| 5,971,252 A | | 10/1999 | Rosen et al. | |
|---|---|---|---|---|
| 6,050,474 A | | 4/2000 | Aota et al. | |
| 6,237,829 B1 | | 5/2001 | Aota et al. | |
| 6,315,187 B1 | * | 11/2001 | Satou et al. | 228/112.1 |
| 6,378,264 B1 | * | 4/2002 | Kawasaki et al. | 52/633 |
| 6,471,112 B2 | * | 10/2002 | Satou et al. | 228/112.1 |
| 6,494,011 B2 | * | 12/2002 | Ezumi et al. | 52/592.1 |
| 6,613,447 B2 | * | 9/2003 | Aota et al. | 428/593 |
| 2001/0004992 A1 | * | 6/2001 | Kawasaki et al. | 228/112.1 |
| 2001/0023566 A1 | * | 9/2001 | Ezumi et al. | 52/638 |
| 2002/0027154 A1 | * | 3/2002 | Satou et al. | 228/112.1 |
| 2002/0119336 A1 | * | 8/2002 | Kawasaki et al. | 428/544 |
| 2002/0139831 A1 | * | 10/2002 | Aota et al. | 228/112.1 |
| 2003/0000996 A1 | * | 1/2003 | Satou et al. | 228/112.1 |
| 2003/0056459 A1 | * | 3/2003 | Ezumi et al. | 52/592.1 |

FOREIGN PATENT DOCUMENTS

| EP | 0797043 A2 | 9/1997 |
|---|---|---|
| EP | 0 797 043 | 9/1997 |
| EP | 0893189 A2 | 1/1999 |
| EP | 0992314 A2 | 4/2000 |
| JP | 11320128 A | 11/1999 |
| JP | 02000061661 A | 2/2000 |
| JP | 020000263251 A | 9/2000 |

OTHER PUBLICATIONS

Maleka, A.H., *Electron Beam Welding—Principle and Practice* (1970), pp. 175–179.

* cited by examiner

*Primary Examiner*—Kiley Stoner
(74) *Attorney, Agent, or Firm*—Antonelli, Terry, Stout & Kraus, LLP

(57) ABSTRACT

A raised portion 32 is provided on an upper face of an end portion of a plate 31 which forms one side of a frame member 30. An end portion of a plate 41 of another frame member 40 is abutted with the plate 31 of the frame member 30. The frame members 30 and 40 are aluminum alloy extruded frame members and the directions of extrusion of the two frame members are orthogonal. A welding padding is carried on an upper face of the plate 41 of the frame member 40. Under this condition, a rotary tool is inserted from above and a friction stir welding is carried out. Accordingly, the padding serves the same function on the plate 41 as the raised portion 32 on the plate 31, so that a good welding can be carried out.

4 Claims, 4 Drawing Sheets

STRUCTURAL BODY FORMED BY FRICTION STIR WELDING

This application is a Divisional application of Ser. No. 09/927,549, filed Aug. 13, 2001, now U.S. Pat. No. 6,471,112 which is a Divisional application of Ser. No. 09/404,651, filed Sep. 24, 1999, now U.S. Pat. No. 6,315,187 the contents of which are incorporated herein by reference in their entirety.

BACKGROUND OF THE INVENTION

The present invention relates to a method of friction stir welding which may be used in welding, for example, aluminum alloy material frame members; and, more particularly, the invention relates to a method of friction stir welding which may be used, for example, in a case where the heights of portions of two abutting aluminum alloy frame members to be joined by welding differ.

As disclosed in Japanese application patent laid-open publication No. Hei 9-309164 (EP 0797043A2), a friction stir welding method is a method in which, by rotating a round rod (called a rotary tool) which is inserted into a welding portion of two abutting frame members to be subjected to welding and moving the rotary tool along a welding line; the welding portion of the two frame members to be subjected to the welding is thermoplastically heated so as to be plastically fluidized and welded.

The rotary tool comprises a small diameter portion to be inserted into the joint of the welding portion and a large diameter portion which is positioned outside of the small diameter portion. The small diameter portion of the rotary tool and the large diameter portion of the rotary tool are positioned on the same axis.

The large diameter portion of the rotary tool and the small diameter portion of the rotary tool are simultaneously rotated. The welding according to the friction stir welding method is applied to an abutting portion and an overlapping portion of the two frame members to be subjected to the welding, which members are made of aluminum alloy materials, for example.

Further, to the welding portion of one frame member to be subjected to the welding, there is provided a raised portion which protrudes in a direction toward the large diameter portion of the rotary tool. This raised portion of the frame member is provided integrally with an end portion in a width direction of a hollow extruded frame member.

The above-stated raised portion provides material for burying a gap which is formed between the two hollow extruded frame members during welding. When a side of the raised portion of the frame member forms an outer face of a product, for example, an outer side of a car body of a railway vehicle, after the welding the remnants of the raised portion of the frame member are cut off.

When the above-stated raised portion is provided on the extruded frame member, the raised portion can be provided to extend along an extruding direction. However, the raised portion of the frame member can not be provided at an end portion of the extruded portion; in other words, the raised portion of the frame member can not be provided at a rectangular direction against the side of the raised portion. As a result, when the extruded frame members are arranged to be orthogonal to each other and the end portions of the extruded frame members are subjected to welding according to a friction stir welding method, a raised portion exists at an end portion of one extruded frame member, however a corresponding raised portion does not exist on the other extruded frame member at the welding portion.

Accordingly, it is considered that a good welding of the two extruded frame members can not be carried out, because one of the extruded frame members does not have a raised portion at the welding portion.

The above stated fact applies generally to a case in which the height of the surfaces in the width direction of the two extruded frame members of the welding portion differ from each other; in other words, for a case in which the height of the surface in the width direction of one frame member differs from the height of the surface in the width direction of the other frame member. The typical situation is that the height of the surface in the width direction of the one frame member is higher or lower than the height of the surface in the width direction of the other frame member.

SUMMARY OF THE INVENTION

An object of the present invention is to provide a method of friction stir welding wherein a good welding can be obtained even when the height of the surfaces of the two members at the welding portion differ.

The above stated object can be attained when the height of the surfaces of the two members at the welding portion differ, by welding a pad on the surface of a member at a low side, followed by friction stir welding of the welding portion of the two members.

Further, the above statement that "the heights of the surfaces of the two members at the welding portion differ" refers to a case in which the above-stated surface side, for example, extends toward an upper portion or a lower portion; however, when the rotary tool is standard as a determination of a position, it means that the distance from the rotary tool to the surface of the welding portion differs, for example. The above reference to "the member being on the low side" indicates a member which is at a larger distance from the rotary tool.

DESCRIPTION OF THE INVENTION

A friction stir welding method according to the present invention as applied to a car body of a railway vehicle will be explained with reference to FIG. 1 to FIG. 6.

Figure 6:
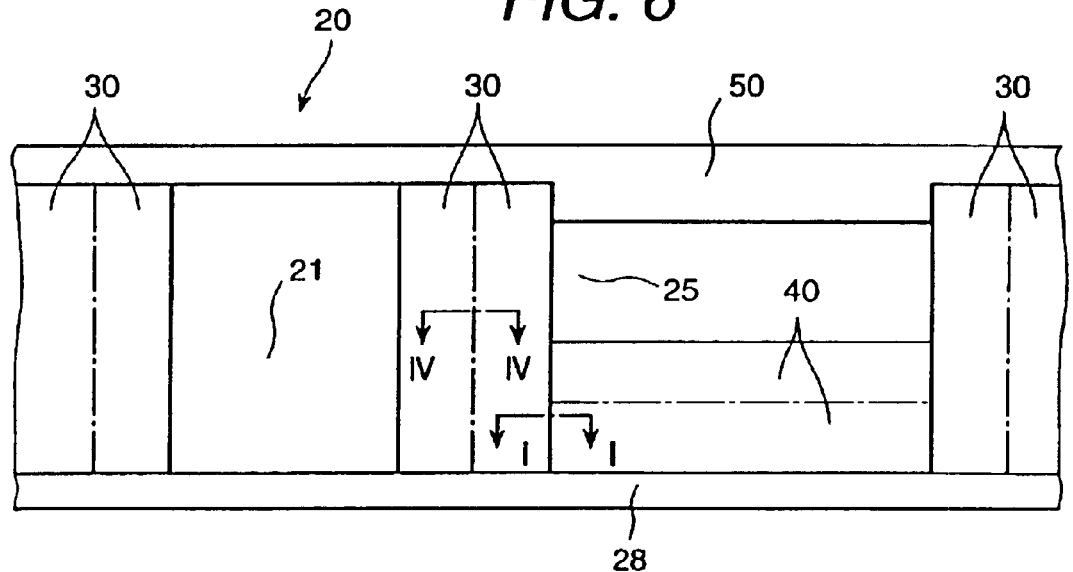
FIG. 6 is a side view showing a car body of a railway vehicle on which the friction stir welding is carried out according to the present invention.

As seen in FIG. 6, the side structure of the body 20 of a railway vehicle is constituted by combining plural aluminum alloy extruded frame members 30, 40 and 50. The extruding direction of the extruded frame members 30, which are made of aluminum alloy materials and are arranged on either side of a doorway 21, and the extruding direction of the extruded frame members 30 disposed between a window 25 and another frame member 30 disposed adjacent to the doorway 21, extend in the vertical direction as seen in FIG. 6.

The extruding direction of the extruded frame members 40, which are made of aluminum alloy materials and are disposed below a window 25, extends in a lateral direction as seen in FIG. 6. In other words, the extruding direction of the extruded frame members 30 and the extruding direction of the extruded frame members 40 are orthogonal to each other. The extruding direction of the extruded frame member 50, which is made of aluminum alloy materials and is disposed at an upper portion of the car body above the doorway 21, also extends in a lateral direction as seen in FIG. 6. The reference numeral 28 indicates a bougie frame of the car body. These members are welded together using a friction stir welding method and an ordinary MIG welding method.

Figure 4:
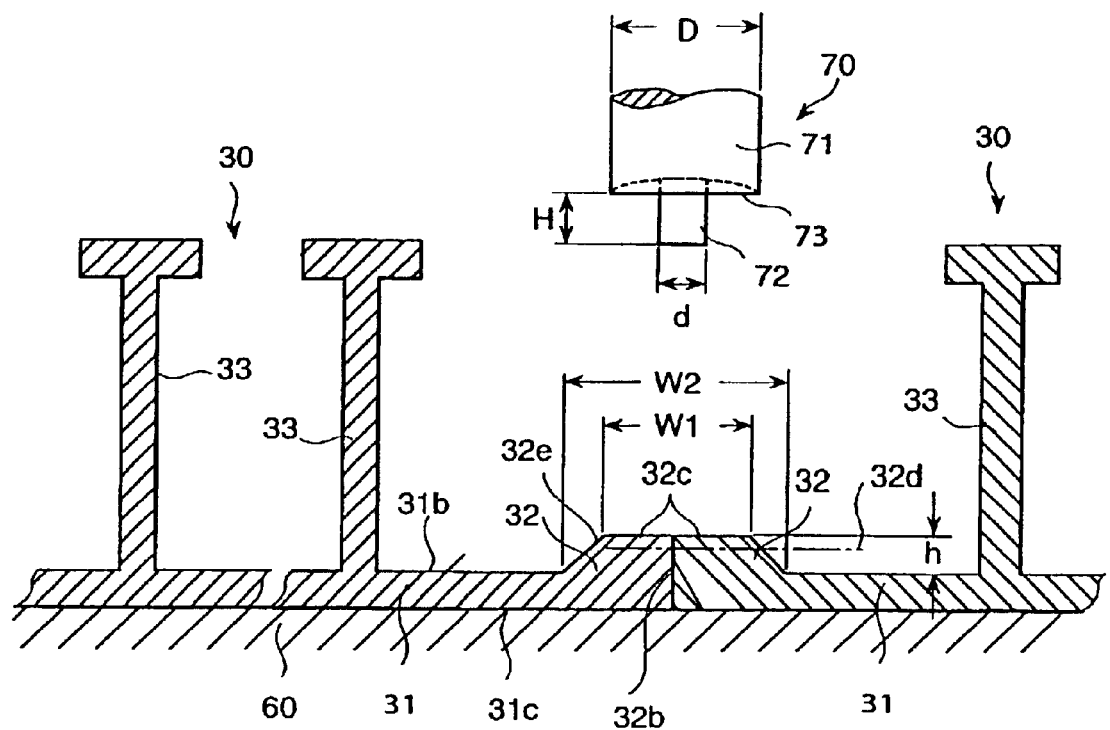
FIG. 4 is a longitudinal cross-sectional view of a welding portion of another part of the two frame members according to the present invention and corresponds to a cross-sectional view taken along line IV—IV in FIG. 6.
Figure 5:
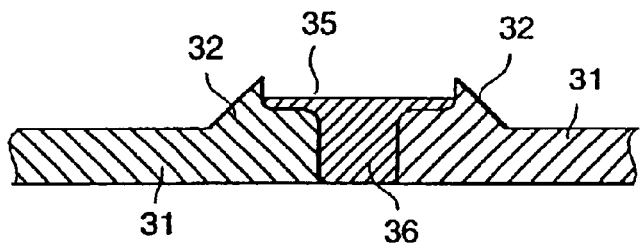
FIG. 5 is a cross-sectional view showing the state of the welding portion after welding in which friction stir welding has been carried out on the two frame members of FIG. 4.

Referring to FIG. 4 and FIG. 5, the friction stir welding of the extruded frame members 30 to each other in which the extruding directions are the same will be explained. The friction stir welding of the extruded frame members 40 is carried out in a similar manner.

The extruded frame member 30 (similarly to the frame members 40 and 50) comprises a flat plate 31 forming an outside surface of the car body and in an inside surface of the car body, and plural ribs 33 are arranged on the inside surface of the flat plate 31. The rib 33 is provided to extend along the extruding direction of the extruded frame member 30 (similar to the frame members 40 and 50).

At one end (an end portion where the frame members 30 abut each other) in the width direction (the direction orthogonal to the extruding direction of the extruded frame member) of the extruded frame member 30, there is a raised portion 32 on the inside of the car body (the rib 33 side).

The height of the raised portion 32 of the frame member 30 is shown as h. A face 32b formed by the end portion of the plate 31 and the end portion of the raised portion 32 is arranged to be substantially orthogonal to an upper face or an apex 32c of the raised portion 32 of the plate 31 of the frame member 30.

Accordingly, when two extruded frame members 30 are abutted, the faces 32b of the end portions of the plates 31 of the frame members 30 come into close contact with each other. However, this is an ideal case. The abutted portion actually is said to have an I-shaped groove form structure.

When friction stir welding is carried out on two abutting frame members 30, in order to not create a gap between the two frame members 30, (to maintain the gap at a predetermined value), the extruded frame members 30 and 30 are restrained or clamped on a stand 60. For this purpose, each extruded frame member 30 is mounted on the stand 60 with the raised portion 32 of the plate 31 directed upward.

Further, the welding portion formed by the ends of the extruded frame members 30 is disposed in close contact with the stand 60, which is made of a steel material.

A rotary tool 70, which is a tool for carrying out the friction stir welding of the two frame members 30, is inserted into the welding portion from above. The rotary tool 70 is constituted by a large diameter portion 71 and a small diameter portion 72 disposed at the tip end (a low end) of the large diameter portion 71.

A boundary surface 73 (formed by an outer peripheral surface of the large diameter portion 71 of the rotary tool 70) between the large diameter portion 71 and the small diameter portion 72 of the rotary tool 70 has an arc shape which is recessed into the large diameter portion 71. The small diameter portion 72 has a screw structure.

During the friction stir welding, the raised portion of the frame member 30 extends into the recess formed by the boundary surface 73 (the outer peripheral portion of the large diameter portion 71 of the rotary tool 70). In other words, the boundary surface 73 is recessed by an amount which is intermediate (a length is a protrusion depth h) between the apex 32c of the raised portion 32 and the face 31b (a face of a non-raised portion) at the inner surface of the plate 31 of the frame member 30.

The friction stir welding is carried out by rotating the rotary tool 70 and inserting it into the welding portion of the two extruded frame members 30; and, while continuing the rotation, moving the rotary tool 70 along a welding line between the two extruded frame members 30. The axial center line of the rotary tool 70 is positioned in alignment with the end face 32b of the extruded frame member 30.

Further, the axial center of the rotary tool 70 is inclined relative to the moving direction of the rotary tool 70. Accordingly, the front end of the large diameter portion 71 of the rotary tool 70 in the direction of movement is positioned to an outer face side (in FIG. 4, an upper portion from the apex 32c) of the apex 32c of the raised portion 32 of the frame member 30. A rear end of the large diameter portion 71 of the rotary tool 70 is positioned to engage the raised portion 32 (to a depth indicated by a line 32d) of the frame member 30. In other words, during welding, the rear end of the large diameter portion 71 of the rotary tool 70 extends into the raised portion 32 to a position between the apex 32c of the raised portion 32 and an extension line of the face 31b of the plate 31 of the frame member 30. The above-stated terms "front" and "rear" are defined with reference to the moving direction of the rotary tool 70.

The relationships between the sizes of the respective constructive parts will be explained. The width W1 of the apexes 32c of the raised portions 32 of the frame members 30 when the two raised portions 32 are abutted is larger than the diameter d of the small diameter portion 72 of the rotary tool 70, but is smaller than the diameter D of the large diameter portion 71 of the rotary tool 70. However, the width W1 of the apex 32c also can be formed to be larger than the diameter D of the large diameter portion 71 of the rotary tool 70.

A width W2 of the base portion formed by two raised portions 32 is larger than the diameter D of the large diameter portion 71 of the rotary tool 70. The height H of the small diameter portion 72, when the raised portion of the frame member 30 extends into the recess formed by the boundary surface 73 of the rotary tool 70, has a size such that the tip end of the small diameter portion 72 of the rotary tool 70 approaches the stand 60 during welding.

For example, the distance between the outer face 31c of the plate 31 and the tip end of the small diameter portion 72 of the rotary tool 70 is approximately 0.1 mm during welding. In other words, the dimensions of the rotary tool and the movement thereof are set to prevent the tip end of the small diameter portion 72 of the rotary tool from contacting the stand 60 during welding. The surface of the apex 32c of the raised portion 32 and the face 31b of the plate 31 of the frame member 30 are joined by an inclined face 32e.

After the two extruded frame members 30 have been fixed to the stand 60, the friction stir welding is carried out. The apparatus for rotating the rotary tool 70 has rollers which move to accompany movement of the rotary tool 70 along the weld. The rollers provided on the rotary tool 70 are arranged on a right side and a left side at a front portion and a rear portion of the rotary tool 70 in the direction of movement of the rotary tool 70 along the weld. When the rotary tool 70 is inserted into the weld portion of the two extruded frame members 30, the rollers contact the faces 31b of the two extruded frame members 30 and the two extruded frame members 30 are thereby pressed against the stand 60.

FIG. 5 shows a state or a condition of the two extruded frame members 30 and 30 after completion of the friction stir welding according to the present invention. The material of the raised portion 32 of the extruded frame member 30 into which the large diameter portion 71 has been inserted is supplied to a gap which is formed between the two abutting frame members 30 and flows out to the outside face of the two extruded frame members 30 as a facet. Also, part of the material remains as a fin on either edge of the raised portion 32. Accordingly, a central portion of the two raised portions 32 of the two extruded frame members 30 forms a recessed portion 35. The gap between the two frame members 30 is filled by the material which is softened by the rotation of the rotary tool 70. For example, the material of the raised portion 32 of the frame member 30 is moved in above-stated gap and the gap is filled in by this material.

From the tip end of the small diameter portion 72 of the rotary tool 70, a softened material is moved to a lower portion of the gap, and then the gap is filled in by the softened material. As a result, the lower boundary of the gap (at the lower end of the frame members 30) is formed substantially in the same plane as the outer face 31c of the plate 31 of the frame member 30. The reference numeral 36 in FIG. 5 indicates a welding bead which is formed to fill this gap.

Since the outer face of the welding bead is formed substantially in the same plane as the outside face 31c of the frame members 30, the thickness of the putty used during the welding can be made thin. Further, since there is a raised portion 32 on the outer face on which the bead 36 does not exist, it can be finished using the hair line processing having no coating.

Figure 1:
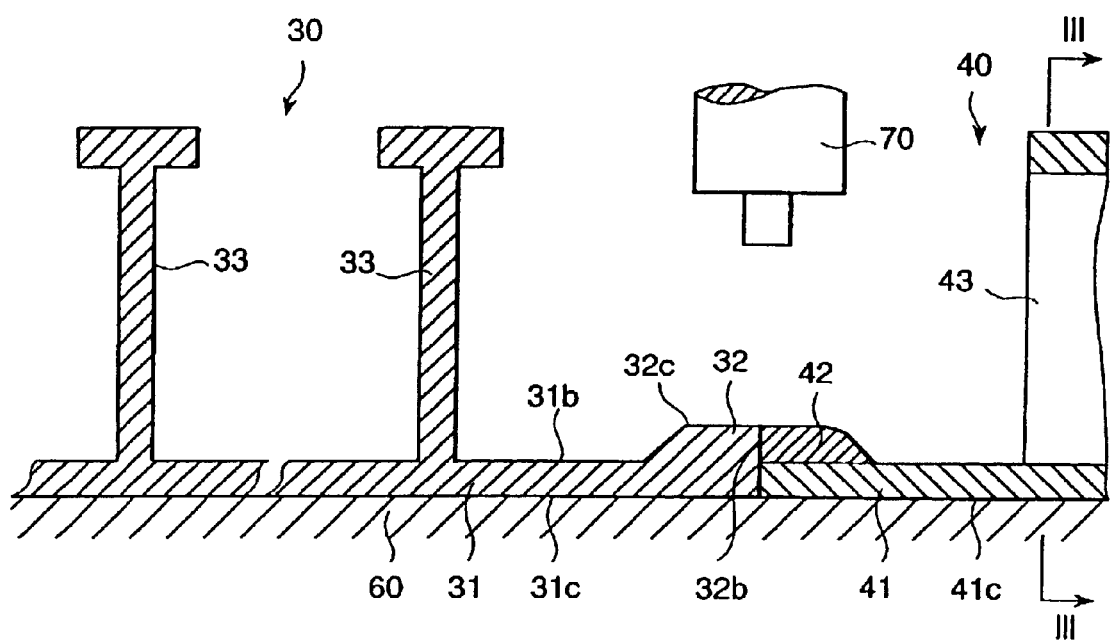
FIG. 1 is a longitudinal cross-sectional view showing a welding portion of two frame members to be subjected to friction stir welding according to the present invention and corresponds to a cross-sectional view taken along line I—I in FIG. 6.

Accordingly, an assembly of the welded frame members 30 and an assembly of the two extruded frame members 40, arranged as seen in FIG. 6, are mounted on and fixed to the stand 60, as shown in FIG. 1. In advance, the rib 43 of the frame member 40 in the vicinity of the welding portion (at both ends of the frame member 40) is cut off, so that the end surfaces of this extruded frame member 40 are formed smoothly. As a result, when the above-stated welding in this embodiment is carried out according to the friction stir welding method, the area in the vicinity of the welding portion can be pressed by rollers into firm contact with the stand 60, as mentioned above.

Figure 2:
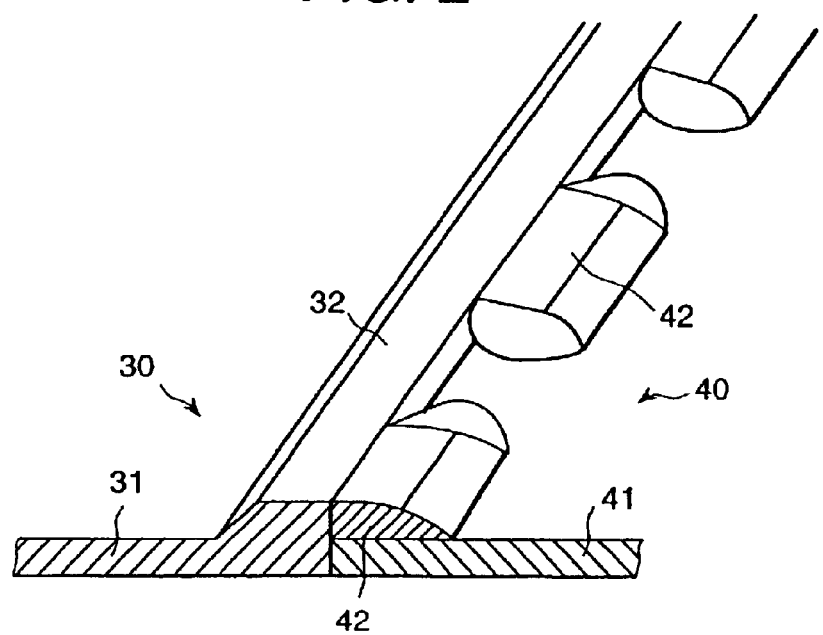
FIG. 2 is a perspective view of the vicinity of a welding portion to be subjected to the welding of the two frame members of FIG. 1.
Figure 3:
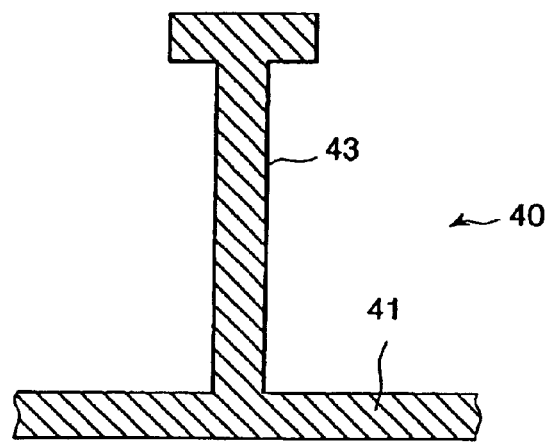
FIG. 3 is a cross-sectional view of a rib of the frame member taken along line III—III in FIG. 1.

Next, as seen from FIG. 1 to FIG. 3, at the abutting portions (the welding portions) of the two assemblies, a welding pad is provided along the end portions of the extruded frame members 40. It is desirable to provide welding pads 42 having a height and a width which corresponds to the height and a width of the raised portion 32 of the frame member 30. For this purpose, it is desirable to dispose a continuous welding pad along to the welding line, but it is also possible to provide intermittently disposed welding pads. For example, the individual welding pads may be about 1 cm in length and be disposed at about 1 cm intervals along the welding line. The strength of these welding pads has to be sufficient that, during the friction stir welding, the material is not thrown out by the rotating action of the rotary tool 70. An allowance will be permitted for the fact that the large diameter portion 71 of the rotary tool 70 will cause the material to be thrown up; since this facilitates the formation of the recessed portion 35.

As stated above, the friction stir welding is carried out on the frame members 30 and the extruded frame members 40 such that the outer faces 31c and 41c of the plates 31 and 41 are aligned substantially in the same plane.

When there is no welding pad portion 42, since the large diameter portion 71 and the small diameter portion 72 of the rotary tool 70 can not extend sufficiently into the extruded frame member 30 and the extruded frame member 40, the material of the raised portion 32 is splashed out and the filling of the material into the gap becomes insufficient. As a result, a good welding of the extruded frame member 30 and the extruded frame member 40 can not be obtained. However, in this embodiment according to the present invention, since the welding pad portion 42 on the frame member 40 serves to supplement the raised portion 32 of the frame member 30, a good welding can be carried out on the extruded frame member 30 and the extruded frame member 40.

The welding pad portion 42 is formed intermittently in this embodiment according to the present invention; however, material will move from the raised portion 32 of the frame member 30 to the side of the frame member 40 during welding. Further, in response to the rotation and the movement of the rotary tool 70, the materials of the raised portion 32 and the welding pads 42 are moved toward a rear portion of the rotary tool 70. As a result of such movement of material along the welding line, a good welding where no welding pad 42 exists can be substantially achieved.

The welded portion in this case becomes substantially as shown in FIG. 5. The remnants of the raised portion 32 of the extruded frame member 30 are provided on one side of the welded portion and the remnants of the welding pad portions which form the raised portion of the extruded frame member 40 are provided on the other side of the welded portion.

When the outer face of the car panel is finished without painting, the above stated welding of the pads is carried out according to the TIG welding method. The filler material is the same material as the frame members 30 and 40. In this regard, by cutting the frame members 30 and 40, the filler material is provided. For example, the end materials of the frame members 30 and 40 may be used for the filler material. According to this embodiment, there is no change of color at the welding portion, so that a nice appearance can be obtained. When the filler material is another material, a change of color appears at the welding portion and a nice appearance can not be obtained.

In the above stated embodiment according to the present invention, after welding the pads, the frame members may be installed on the stand 60 to form the panels. In the above stated embodiment of the present invention, the welding of the extruded frame members to each other is effected for constituting the side structure body, however such welding techniques can be used to join other members as well.

Figure 7:
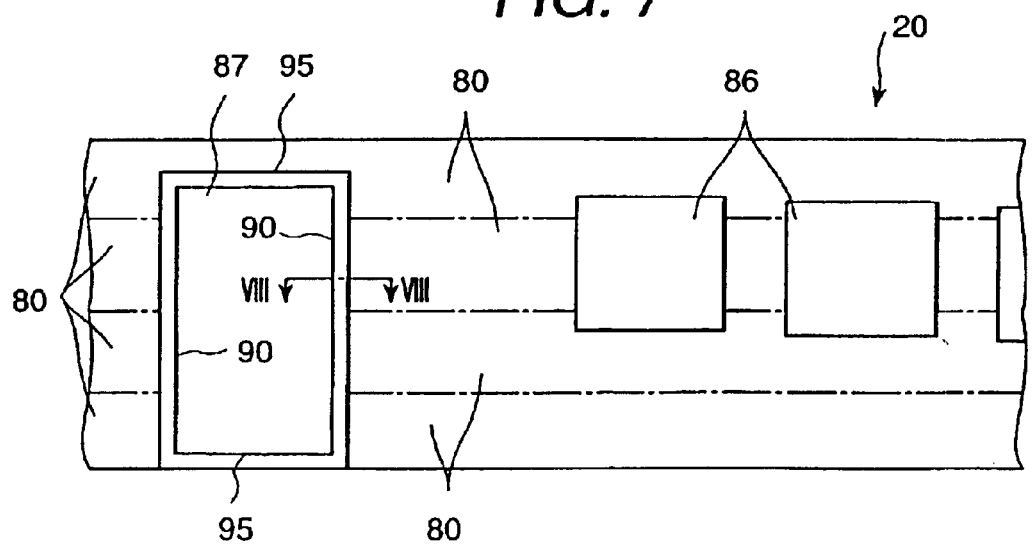
FIG. 7 is a side view showing another car body of another railway vehicle on which the friction stir welding is carried out according to the present invention.
Figure 8:
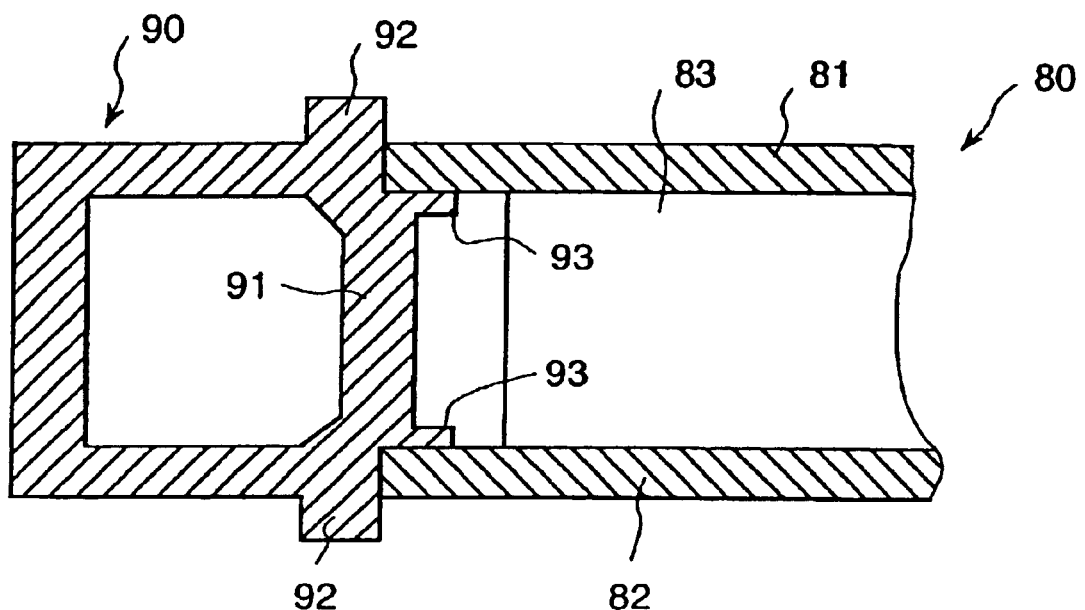
FIG. 8 is a cross-sectional view of the two frame members taken along line VIII—VIII in FIG. 7.

Another embodiment according to the present invention will be described with reference to FIG. 7 and FIG. 8. An extruded frame member 80 is arranged in longitudinal direction of a car body. The extruded frame member 80 is a hollow-shaped frame member made of an aluminum alloy material. A raised portion is formed at both faces of the end portions in a width direction of the extruded frame member 80. The welding of the frame members 80 to each other is carried out using the friction stir welding method by utilizing the raised portion to supply material to the weld.

The reference numeral 86 identifies a window and the reference numeral 87 identifies a doorway. Reference numerals 90 and 95 are extruded frame members for constituting a frame of the doorway 87. The frame member 90 constitutes a vertical side frame member and the frame member 95 constitutes an upper side and a lower side frame member. The extruded frame members 90 and 95 are welded to each other according to the friction stir welding method. The frame formed by the extruded frame members 90 and 95 and the extruded frame member 80 are also welded to each other according the friction stir welding method. The frame member 90 is a hollow-shaped frame member made of an aluminum alloy material.

Raised portions 92 are provided at both faces at adjacent corner portions of the frame member 90. Further, projecting chips 93 which project toward the frame member 80 are provided. The projecting chips 93 are inserted into the hollow interior of the two plates 81 and 82 of the frame member 80.

In the frame member 80, the inner rib 83 is deleted—or cut off to accommodate the insertion of the projecting chip 93. According to the width of the vertical side 91 of the frame member 90, an abutting face between the raised portion 92 and the frame member 80 is provided. The construction of the frame member 95 is the same as the construction of the frame member 90. The two plates 81 and 82 of the frame member 80 are arranged substantially in parallel.

After the frame members 80 have been joined by friction stir welding, the frame members 90 and 95 are joined. Then, the frame members 80, 90 and 95 (excluding the raised portion 92) are mounted on the stand 60. Along the frame members 90 and 95, and to end portions of the frame members 80, the welding of the pads is carried out. After that, the friction stir welding to join the panels formed by frame members 80 to the frame formed by frame members 90 and 95 is carried out.

The friction stir welding is carried out on one face at a time or is carried out simultaneously on both faces. After the friction stir welding, the remnants of the raised portions on the outer side of the railway vehicle and the remnants of the welding pads are cut off, and then the outer side of the railway vehicle is formed smoothly.

The above-stated embodiment according to the present invention can be applied to a case in which the frame of a window is installed using the friction stir welding method. Further, in the above stated embodiment, a hollow-shaped frame member is adopted, but the frame member shown in FIG. 1 can be used instead.

In the above stated embodiment according to the present invention, when members having a different thickness at the end thereof are abutted, such as might occur as a result of a manufacturing error, so that the height of the surface of the welding portion is not uniform, the use of welding pads may be employed for the member at the low side, after which the friction stir welding can be carried out.

Further, the indication that "the height of the surface of the welding portion is not uniform" refers to a case in which it is assumed that the surface portion on one side of the welding line is higher than the other, for example; however, when the rotary tool is standard, for example, it means that the distance from the rotary tool to the surface on either side of the welding line differs. The reference to "the member at the low side" indicates a member which is at a greater distance from the rotary tool.

Figure 9:
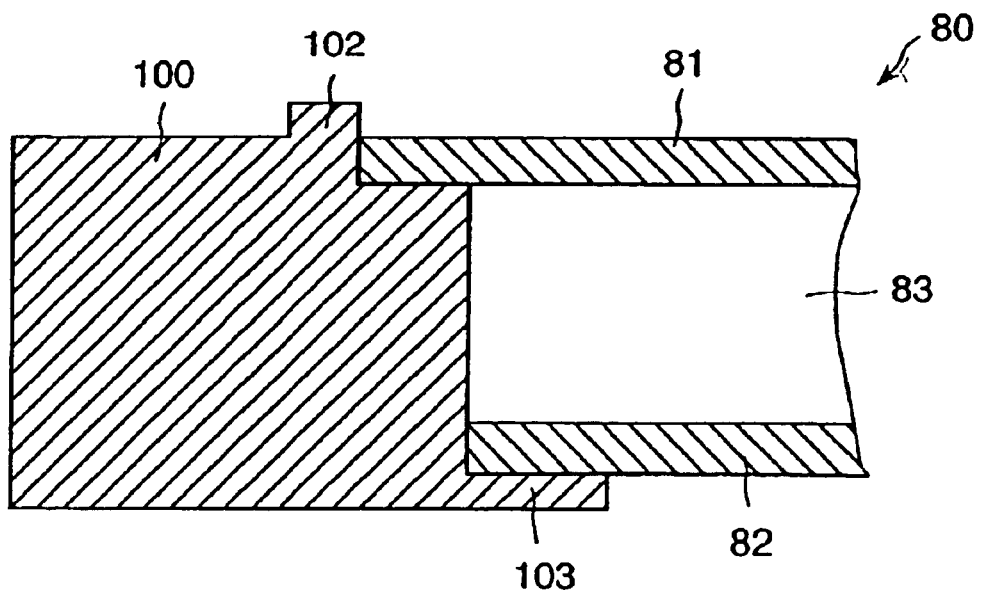
FIG. 9 is a cross-sectional view showing a further car body of a further railway vehicle on which the friction stir welding is carried out according to the present invention and which corresponds to the embodiment shown in FIG. 8.

A further embodiment will be explained with reference to FIG. 9. The structure shown in FIG. 9 substantially corresponds to that of FIG. 8. In this embodiment, both the rib 83 of the end portion of the hollow frame member 80 and the end portion of the plate 82 of the inner side of the car body are cut off and removed. An end portion of an outer side of an extruded frame member 100 is abutted to the plate 81. To this end portion of the extruded frame member 100, a raised portion 102 is provided, and this raised portion 102 is projected toward the outer side of the car body.

An outer face of the extruded frame member 100, excluding the raised portion 102, and the outer face of the plate 81 are arranged to be substantially in the same plane. A projection chip 103 of a face on the inner side of the car body on the extruded frame member 100 is overlapped on the plate 82 of the extruded frame member 80. The extruded frame member 100 is not a hollow-shaped frame member, but is solid to provide increased strength.

When the solid extruded frame member 100 has been mounted on the stand 60 in engagement with the frame member 80, the abutted portion between the plate 81 and the extruded frame member 100 is subjected to friction stir welding from an upper position. The friction stir welding method is carried out using the raised portion 102 to provide material for the weld. Next, the structural body is turned over, and then the projection chip 103 and the plate 82 are fillet welded using arc welding. Further, in a case where there is no projection chip 103, the abutted portion between the plate 82 and the extruded frame member 100 is welded.

The technical scope of the present invention is not limited to the description provided in this specification, but can cover a range in which a man of ordinary skill in this field easily understand from the description.

According to the present invention, in the case where the height of the surfaces of two members at welding portion differs, a good welding of the two members can be obtained.

What is claimed is:

1. A structural body comprising:
   an end portion of a first member abutting and welded to an end portion of a second member; and
   a welded portion which protrudes from said first member and said second member in a thickness direction thereof, a central portion of said welded portion in a width direction being recessed;
   wherein said welded portion includes a first protruding portion which is derived from said first member and a second protruding portion which is derived from a padding welded on said second member.

2. A structural body according to claim 1, wherein:
   said first member and said second member are extruded frame members; and
   said end portion of said second member is an end portion of an extruded portion of said extruded frame member of the second member.

3. A structural body, comprising:

a hollow frame member and an extruded frame member, welded to each other from an outer portion of said hollow frame member using friction stir welding, wherein a rib, provided between two plates of said hollow frame member at a portion where said friction stir welding has been carried out, has been removed;

an end portion of said extruded frame member is inserted between said two plates; and an extruding direction of said hollow frame member and an extruding direction of said extruded frame member are arranged to be substantially perpendicular.

4. A structural body, comprising:

a plate on one side of a hollow frame member, and an extruded frame member, welded to each other from an outer portion of said hollow frame member using friction stir welding, wherein a rib provided between said plate on said one side of said hollow frame member and a plate on another side, which is arranged to be substantially perpendicular thereto at a portion where the friction stir welding is carried out, and an end portion of said plate on said another side, have been removed;

said extruded frame member is welded to said plate on said another side; and an extruding direction of said hollow frame member and an extruding direction of said extruded frame member are arranged to be substantially perpendicular.

* * * * *